Figure 1:
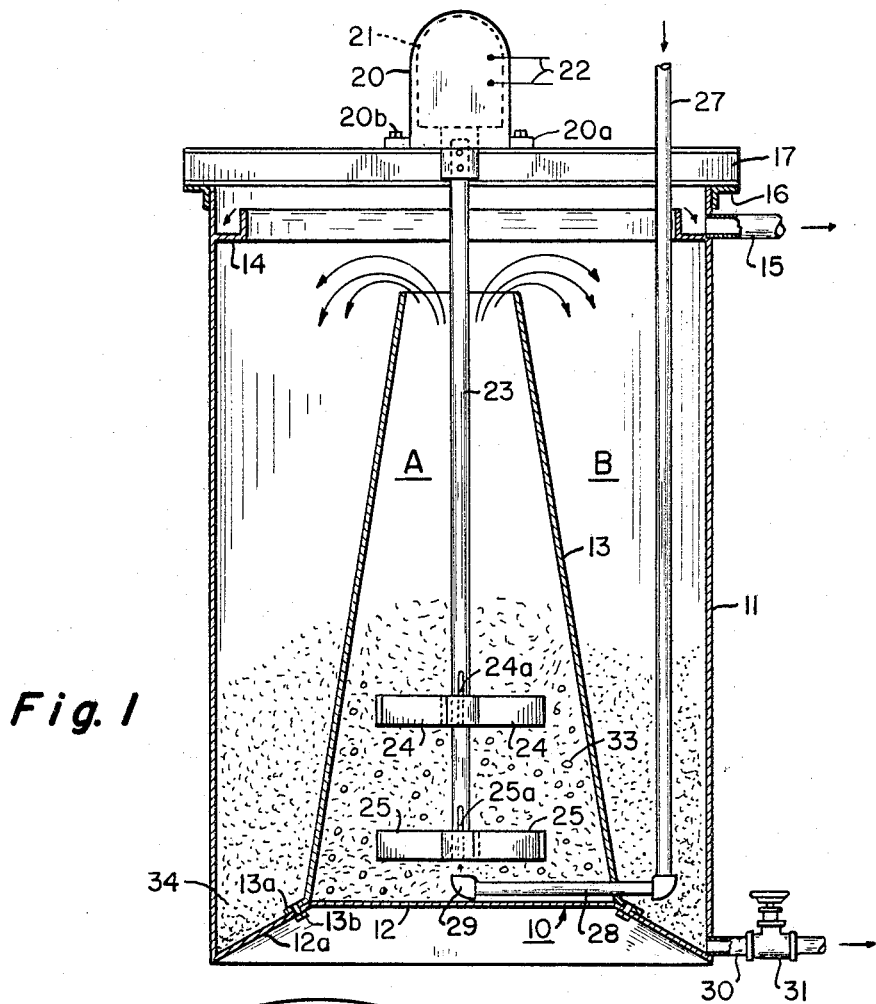

Dec. 27, 1966

L. E. LANCY 3,294,680

TREATMENT OF SPENT COOLING WATERS

Filed Nov. 18, 1964

INVENTOR.
Leslie E. Lancy

BY Green, McCallister & Miller

HIS ATTORNEYS

United States Patent Office 3,294,680
Patented Dec. 27, 1966

3,294,680
TREATMENT OF SPENT COOLING WATERS
Leslie E. Lancy, Ellwood City, Pa., assignor to Lancy Laboratories, Inc., Zelienople, Pa., a corporation of Pennsylvania
Filed Nov. 18, 1964, Ser. No. 412,148
12 Claims. (Cl. 210—49)

This invention relates to the conditioning of spent waters, such as those used for cooling purposes, to remove their toxic content before discharge into a sewer or stream. It particularly relates to the treatment of waters containing a dissolved toxic chromium compound, such as chromic acid or chromate.

A phase of the invention pertains to a simplified and improved method or system for making the toxic chromium solution content of used cooling waters innocuous for discharge into sewers, streams, etc.

Cooling water as used in various industrial processes is usually recirculated throughout the system. The heat taken up by such water is removed through a cooling tower, spray pond or other means of heat exchange. Such waters when evaporated to remove their heat, of course, lose a portion of their aqueous content and have to be replenished with fresh water. In addition and importantly, the evaporation also leads to a build-up of the dissolved salt content of the water.

By way of example, original make-up water may have a dissolved content of 200 p.p.m. When about 50% of the water content is lost due to evaporation and made up with new additions of fresh waters, the dissolved salt concentration will build-up to about 300 p.p.m. As this build-up continues, the dissolved salt concentration crystallizes out on the walls of the equipment through which the cooling water circulates to produce scaling. To control the scaling tendency, it is necessary to continuously "blow-down" a certain quantity of water, wasting it from the system, in order to maintain a dissolved salt below a scaling concentration. Permissible concentrations of dissolved salts depend upon the temperature of the cooling water, the type of water, and the equipment used. The particular matter of interest, however, is that a continuous water blown-down is necessary, whose volume depends upon the particular industrial application, but will usually be in the range of about 10 g.p.m. or less up to about 200 g.p.m. or more.

Cooling water is usually aerated and is thus corrosive to the cooling system in which it is used. The common inhibitor for limiting corrosion is chromic acid or a chromate salt. It is well known that a dissolved chromium compound, such as chromic acid, is highly toxic to aquatic organisms and its discharge falls under the regulation of state sanitary and health authorities. The usual limit of chromic acid concentration in waste water to be discharged is between about .1 to 1 p.p.m. On the other hand, the usual concentration of the chromic acid or chromate salts employed as oxygen inhibitors is about 15 to 200 p.p.m. or considerably above the allowable range.

It is thus apparent that treatment must be accomplished on the cooling water blow-down containing chromic acid or chromate salts. The conventional waste treatment requires either large holding basins to provide for the collection and treatment of the waste or electronic instrumentation for sensing the amount of chromic acid, for adding the required chemicals, and for neutralizing the treated waste. The passing of waste cooling water through an ion exchange bed has also been advanced as a method of treatment. A large industrial complex may have several independent cooling water systems at far removed locations near the particular applications where the cooling water is to be used, recirculated and wasted. It thus becomes an expensive and tedious responsibility to provide a waste treatment system at each location and, on the other hand, it is expensive and involves a complicated use of water lines if a central treating system is to be used.

As a result of the relatively high flow rates and high equipment costs for installations, such as above mentioned, which involve expensive equipment, high maintenance cost, etc., investigation has been made of inhibitors of a different chemical nature such as an amine. Amines, however, are more expensive and not as efficient as inhibitors and are also toxic from the standpoint of waste discharge. In view of their nitrate and nitrogen content, they lead to a pollution problem by reason of the high fertilizer value of the compounds, thus increasing algae growth in the water.

In the waste treatment of chromic acid and chromate salts, a reducing compound is customarily used, such as sodium bisulphate, sodium sulfite, ferrous sulfate, etc. It has heretofore been determined that these chemicals will act as reducing compounds only in the acid range and thus, usual recommendations are for a pH of about 2.5 to 3.5 for the chemical reactions. However, since the spent or waste cooling waters usually have a pH approaching neutral (7) or slightly on the alkaline side (in the neighborhood of about 7.6 to 7.7), this additionally entails a pre-treatment of the waters in order to bring them within an effective acid treatment pH.

It has been an object of my invention to solve the problem presented in the treatment of chromic acid or chromate salt containing spent cooling waters, particularly from the standpoint of expense and complexity;

Another object of my invention has been to devise an effective system and procedure for treating chromic acid containing waste cooling waters for directly, simply and efficiently making them innocuous or non-toxic for their discharge into a sewer or a natural stream;

A further object of my invention has been to provide a one-step chemical treatment for waste waters that will effectively neutralize or make innocuous their chromium content, without adding further toxicity thereto, and in such a manner as to make substantially continuous utilization of the materials or chemicals involved in the reactions;

A still further object of my invention has been to devise a new and improved type of waste treatment for making spent cooling waters innocuous which may be inexpensively and readily adapted to a plurality of plant installations at individual locations at which the cooling waters are used, and without the need for a central collection and treatment system;

These and other objects of my invention will appear to those skilled in the art from the disclosure thereof as hereinafter set forth.

Figure 2:
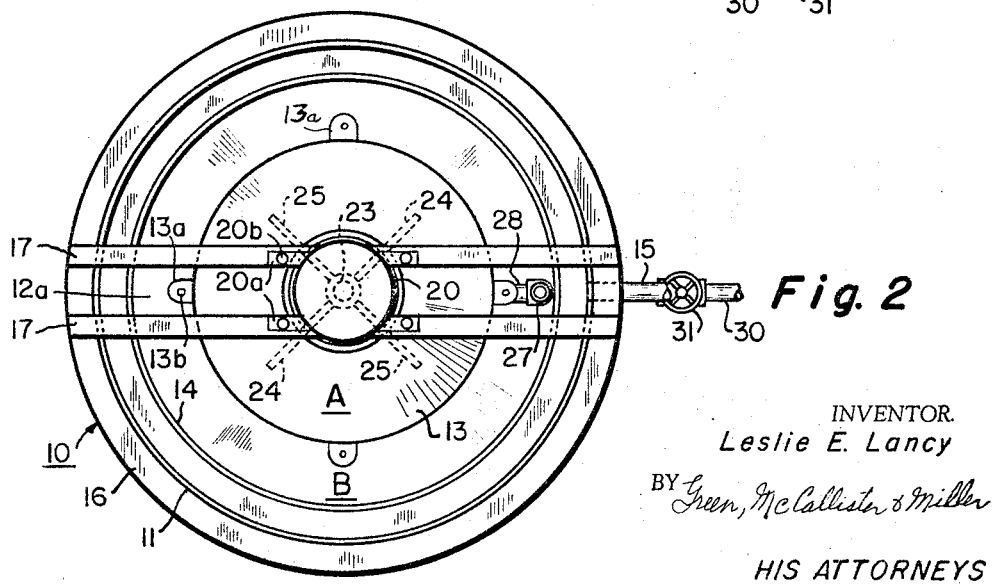

In the drawings, FIGURE 1 is a vertical section in elevation through an apparatus suitable for carrying out my invention; and FIGURE 2 is a top plan view on the scale of and of the apparatus shown in FIGURE 1.

As previously intimated, the cooling waters in a system are at a neutral to slightly alkaline pH, since the welding, compressing or electric apparatus being cooled will be adversely effected if the waters are not neutral or slightly alkaline. Thus, in simplifying the process, it is important to make use of the cooling waters in their neutral or slightly alkaline state, without having to resort to treatment in order to condition the waters so that they are well within the acidic range of pH. As previously indicated, ordinary sulphur-containing reducing compounds used in the waste treatment of chromic acid and chromate salts, are efficient reducing compounds only when the waste waters are acid; a pH range of 2.5 to 3.5 is recommended for accomplishing the necessary chemical reactions.

Although hydrogen sulfide and sulfides of various metals will also act as reducers, I have determined that they are normally very sparsely soluble and that they are only suitable for a so-called one pass conditioning of waste waters. For example, iron pyrites (FeS) are in theory soluble in a range of about 4 to 5 mg./liter. I have, however, importantly discovered that the reaction of a metal sulfide in a chromium containing solution is essentially a surface reaction. If, as previously believed by those skilled in the art, it is dependent on the metal sulfide in solution, there would be a low rate of reaction, making its use non-feasible from a commercial standpoint.

The chromic acid or chromate salts are used in the waste water because of their great surface affinity for and good inhibiting properties on steel, zinc and aluminum surfaces through which the cooling water may pass. On steel structures, the acid sets up a very thin oxide or passive film with some chromic anhydride adhering thereto. I have found that the chromic anhydride is removed from the system when it is charged with fresh water carrying chromic acid. There is a continuous consumption of the chromic acid, since small electrolytic cells are formed on the metal surfaces through which the waters pass. The chromic anhydride is reduced to a trivalent form which does not have the same inhibiting quality. Thus, a high concentration of chromic acid has to be maintained to insure the availability of a sufficient inhibitor on the surface that may have suffered an invisible damage to its protective film.

In experimenting with the use of metal sulfides that are relatively insoluble in water, I have discovered that their lack of reaction efficiency is due to the fact that the chromium content of the waste waters also cause a quick build-up of an invisible or passive film on the surface of their crystals and that this film tends to block the reactions. Since sulfur is an insoluble element when released from the metal sulfide, it also appears that it tends to form as a coating on the crystals.

I have made the surprising discovery that if the invisible coating is continuously removed that metal sulfide particles or granules, and particularly iron sulfide granules, will be highly effective and can be used in a continuous manner until they are fully used-up or reacted in rendering innocuous chromic acid containing spent cooling waters. Still more surprisingly, they will be effective and can be used continuously, even if the waters are in their usual neutral or slightly alkaline pH condition. In my experiments, I prepared a column of 200 grams of fine mesh iron sulfide about 20 inches in height and ½ inch in diameter, and passed 100 ml. of a water solution containing 15 p.p.m. hexavalent chromate in the form of chromic acid twice therethrough. The first pass through the column was properly treated, but the second pass indicated that the 100 ml. sample was completely untreated. This substantiated my theory of the blocking of the reaction by the forming of an invisible coating on the iron sulfide.

It is necessary, in carrying out my invention, to use a chemical compound that has a body in the sense of a hard body that may be mechanically abraded during its use, for example, as accomplished by a mechanical stirrer. In this connection, I determined that metal sulfides, such as zinc and calcium sulfides and particularly iron sulfides, will work satisfactorily. Iron sulfide in the form of a pyrite is a low cost material. I have found that both the iron and the sulfide of this compound will act as reducers which is not true from the standpoint of zinc or calcium sulfides. Further, there are no soluble compounds formed by the reactions of iron sulfide, and the effluent will be free of toxicity and soluble compounds. The products of the reactions, such as ferric hydroxide, are relatively easy to settle and can be carried out from the system to a settling compartment to further provide the benefit of clarifying the water leaving the system. Thus, although calcium and zinc sulfides may be used in carrying out my invention, I have found that iron sulfide, such as in the form of an iron pyrite ($FeS_2$), is much better in its employment.

I have determined that for the lower side of a working range of granules or particles of metal sulfides, they should pass about a 200 mesh screen as a minimum. Under this size, the pebbles, particles or granules tend to be carried out by the water flowing through the system. On the other hand, the upper side of the range should be of below about ½ inch in size, since larger sizes tend to have smaller surface areas for their weight to be kept in motion in the water solution. My process depends upon an effective surface area on which the reaction will proceed, and additionally on a stirring action that will rub the surfaces of the particles or granules against each other and continuously remove the invisible film thereon. An optimum size of metal sulfide granule has been found to be about 25 to 50 mesh.

In accordance with my invention, metal sulfide particles or granules are used, and are subjected to solution flotation and mechanical abrasion, by the use of a stirrer or of velocity pumping of the solution. In this manner, the particles touch, rub and scrub against each other to clean their surfaces and make them reactive. This enables the process to be carried out continuously until the metal sulfides are used up or reach a below minimum size.

Contrary to previous teachings of the art, the chromic acid reduction reaction can be effectively accomplished, even with neutral pH and continuously. A relatively small reaction vessel containing small quantities of iron pyrite particles will provide for a high and fast reduction rate for the reduction and precipitation of chromic acid. In an experiment in this connection, a solution containing 15 p.p.m. hexavalent chromium as a chromic acid having a pH of 7.6 to 7.7 (slightly alkaline range) was used with 200 grams of fine mesh iron pyrites in one liter of solution. After one hour of agitation treatment, the chromic acid content was completely eliminated.

In another experiment, I established that a continuous flow system could be utilized. A one liter container was used with 200 grams of fine mesh iron pyrites in a solution containing 15 p.p.m. of hexavalent chromium. The solution had a pH of 7.6 to 7.7. Employing a flow rate of 174 ml./hour, the effluent flowing from the container showed no chromic acid in solution. Even when the flow rate was increased to 240 ml./hour through the one liter container, no chromic acid was found in the effluent. When the flow rate was increased to 600 ml./hour, the effluent contained approximately 4 p.p.m. hexavalent chromium expressed as chromic acid. The pH in the high rate of flow experiments slowly decreased to between about 4.5 to 5.6, but without an adverse effect on the reactions. It was indicated that the reactions taking place in the system were due to both the full reducing capacity of the ferrous ion and of the sulfide ion, thus making the system most economical from a chemical consumption standpoint. By continuously scrubbing the granules of the pyrites, I achieved continuous removal at high flow rates, and with substantially complete treatment accomplished. Hourly flow rates representing 50 percent of the volume of the container have been successfully employed.

The iron pyrites or other metal sulfides, being themselves insoluble in the solution, are only consumed at the rate the chromic acid or chromate salts enter the system. The conversion is effected of insoluble sulfides into soluble metal salts and finally, in view of the pH, into insoluble metal hydroxides. The sulfide ion, itself, will go from the insoluble sulfide ion to the insoluble sulfur, and the chromic acid or chromate salts will go from the hexavalent and soluble form to trivalent chromate and insoluble hydroxide form, in view of the pH under which the system operates. Using iron sulfate, for example, the precipitated iron and precipitated chromic acid remove hydroxide from the solution and therefore, tend to slightly reduce its pH. This slight reduction can be offset by the addition of a self-regulated alkali bed through which the effluent is flowed after treatment. Usually, the alkalinity of the water tends to be higher in view of the dissolved salt concentration and other additions, such that this slight reduction in pH will not occur. It is considered that an acid content of as high as 5.5 is not harmful by most regulating agencies.

A simple retention basin or settling tank may be used after the treatment to insure the complete precipitation and retention of the iron and the non-toxic precipitated trivalent chromium salts. Insoluble chromium hydroxide is non-toxic, even if retention is not complete, since living organisms will not be effected by insoluble materials. The settling-out may be efficacious where it is desired to avoid turbidity of the water.

Summarized briefly, I have been able to provide a self-regulating treatment system for used, spent or waste chromic acid or chromate salt containing cooling waters by utilizing granulated or pulverized metal sulfide particles that are suspended in the solution, and are activated to scrub each other by mechanical agitation or positive pumping, so that there is always a good contact made between the toxic chromate ion and the surface of the metal sulfide particles. My system has been found useful for waste solution treatment, such as of waste cooling waters containing more than 1 p.p.m and up to 500 p.p.m. or more chromic acid. The reaction accomplished is represented by the following equation:

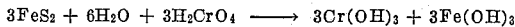
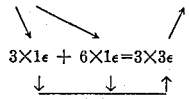

$$3FeS_2 + 6H_2O + 3H_2CrO_4 \longrightarrow 3Cr(OH)_3 + 3Fe(OH)_3$$

$$3 \times 1e + 6 \times 1e = 3 \times 3e$$

In FIGURES 1 and 2 of the drawings, I have illustrated apparatus suitable for carrying out my procedure. This apparatus employs a tank-like structure or containing unit 10 having a main or outer vertical side wall or member 11 that is shown of circular shape. The outer side wall 11 defines a vertical tank or container having an open top or mouth portion with a substantially planar central bottom wall portion 12 and a peripheral, inwardly-upwardly sloped or downwardly-outwardly-declining bottom wall portion 12a. The central bottom wall portion 12 is shown positioned on a horizontal plane above the lower end of the side wall 11.

The inside of the container unit 10 is divided into a central, upwardly-projecting reaction and stirring chamber A and an outer, surrounding, discharge-receiving, and sludge-collecting chamber B. These two chambers are defined by an inner-intermediate or central, substantially frusto-conical shaped partition wall or member 13 that projects upwardly from the line of connection or jointure between the bottom wall portions 12 and 12a or, in other words, from the outer peripheral extent of the central bottom wall portion 12. The partition wall member 13 is open near its top in a downwardly-spaced but adjacent relation with respect to the top of the main or outer side wall 11; it is removably-secured by angular tabs 13a and bolt and nut assemblies 13b to the bottom wall portion 12a.

An upper or overflow trough 14 of angular shape extends annularly about and projects inwardly from the outer wall 11, adjacent its upper end. The trough 14 has a spaced relation between the upper end of the outer wall 11 and the upper end of the inner or chamber-defining partition wall 13. An outlet pipe 15 is open through the outer wall 11 to the trough 14 for delivering or taking-off conditioned cooling water from adjacent the top level of the liquid in the container or tank unit 10. In other words, the downstream flow of the conditioned water is accomplished by overflow from the upper level of the liquid within the container unit 10.

A circular or annular-shaped, outwardly-projecting flange 16 is secured, as by welding, to the outer side of the outer wall 11 and substantially flush with its upper edge, to reinforce it and provide a mounting for a pair of transverse or cross-extending, spaced-apart, channel-like support members 17. A motor housing 20 is positioned to extend across and to be secured to project upwardly from the support members 17 by means of mounting flanges 20a and bolts 20b. A suitable motor, such as an electric motor 21, is shown positioned within the housing 20. It is energized by a suitable source of electricity 22 which may be A.C. or D.C., as may be available.

The motor 21 carries a vertical, downwardly-extending shaft 23 that projects centrally-downwardly within the chamber A and along the central axis of the partition wall member 13. A pair of agitator blades 24 and 25 are shown respectively secured on the shaft 23 by means of wedge pins 24a and 25a. As shown particularly in FIGURE 1, the blade 25 is secured at the lower end of the shaft 23, and the blade 24 is secured in a vertically-upwardly-spaced relation therewith. As shown particularly in FIGURE 2, the blades 24 and 25 have a cruciform or staggered relationship with each other or, in other words, extend at right angles to each other to, in effect, define quadrant spaces therebetween.

Cooling water to be conditioned is introduced into the unit 10 by an inlet vertical down pipe 27 which is secured to the trough portion 14 and extends downwardly in a spaced relation along an inner side of the outer wall 11 within the chamber B. The lower end of the down-flow pipe 27 terminates adjacent to or slightly above the central bottom wall portion 12. A horizontal extension pipe 28 is shown connected to the lower end of the pipe 27, and as extending through an opening in the partition wall 13 to terminate adjacent the axis of the shaft 23. The inner end of the horizontal pipe 28 is shown provided with an L-connector 29 whose open top or nozzle end is directly in line with the shaft 23, to deliver toxic water containing a chromium compound in solution in an upwardly-moving path, as indicated by the arrows of FIGURE 1.

The central or inner chamber A is substantially filled, as shown in FIGURE 1, with metal sulfide granules or particles 33, such as iron pyrites. In FIGURE 1, I have indicated sludge 34 that is being settled-out of the conditioned and now innocuous water or liquid in the chamber B. The sludge 34 may be periodically removed by flushing it out of a lower trough or downwardly-offset portion of the chamber B, as defined by the bottom portion 12a, through an outlet pipe 30 and a valve 31.

Employing the apparatus of FIGURES 1 and 2, the contaminated, toxic solution or water entering the inlet pipe 27 flows downwardly in a segregated relation with respect to the chamber B, and is introduced within the chamber A to flow upwardly through the bed or loose mass of metal sulfide particles contained therein, out over the upper edge of the intermediate wall member 13, and then downwardly into the chamber B. Sludge 34 within the solution may then settle out within the bottom of the chamber B and the reacted purified solution is then overflowed from the top of the chamber B into the trough 14 from which it may flow as a return flow through outlet 15 into a stream or sewer system as a non-toxic solution, water or aqueous discharge. The motor 21 is rotated at a suitable speed, for example, at a speed of about 5 to 20 r.p.m., so as to continuously, through the agency of the blades 24 and 25, agitate the sulfide particles 33, as well as the solution within the chamber A, to effect a full reaction from the standpoint of the dissolved chromium content, such as chromic acid or chromate, before it leaves the chamber A and is introduced into the chamber B. After a sufficient amount of sludge 34 has been accumulated in the bottom of the chamber B, it may be removed as before indicated.

It will be noted that the central bottom portion 12 is positioned upwardly from the lower edge of the outer wall 11 so as to define an outer collecting trough with such wall by reason of the employment of the sloped outer bottom wall portion 12a.

It will be noted that the harmful chromium compounds are the dissolved hexavalent chromic acid or chromium salts. The effective toxicity of the chromium compounds is mainly due to the fact that hexavalent chromium will not precipitate as an insoluble salt, even though the pH conditions are about neutral or slightly alkaline. For removal, that is precipitation of the chromium compounds, it is necessary to first reduce them to a trivalent state. In accordance with my invention, I react the chromium compounds through the use of metal sulfides to reduce them to trivalent compounds. When an iron sulfide is employed, I make use of both the reducing power of the iron cation and of the sulfide anion to effect an efficient consumption of chemicals and a maximum utilization of consumed chemicals. This results in a highly economical reduction of the hexavalent chromium compounds into trivalent compounds. Although iron sulfide (FeS) is suitable, iron pyrites ($FeS_2$) are readily available and have been highly satisfactory in this connection.

I have determined that the precipitation of trivalent chromium and trivalent iron is assured as long as alkalinity is available for precipitation. Although a metal sulfide, such as iron, may take-up hydroxide and precipitate where the pH of the waters is above about 3.5, the chromium requires a pH of above about 5.5 to take-up hydroxide for its precipitation. Thus, in carrying out my invention, it is necessary to provide the spent cooling water with an approximately neutral to slightly alkaline pH, in order to effectively and efficiently remove or precipitate the trivalent chromium. Although the pH of waters as supplied to a cooling system may vary, I have found that waters having a pH of about 7.5 to 8 as supplied to the system and as later spent in cooling the system, have sufficient alkalinity in a spent condition for the carrying out of my procedure.

It will be apparent that, in accordance with my invention, dependence is placed upon the direct reaction of the surfaces of the hard metal sulfide granules with the hexavalent toxic chromium solution content of the spent cooling water, as distinguished from a reaction with a soluble metal sulfide content imparted to the solution. It is well known that zinc and iron sulfides are insoluble in water and that calcium sulfide has only a slight solubility in water. By using sulfides of this nature and particularly, the optimum sulfide of iron, I thus inherently inhibit the forming of a soluble sulfide in the water from the sulfide granules and, in effect, provide a self-regulating procedure wherein the metal sulfide granules are essentially only consumed by their reaction with the hexavalent chromium solution content of the water. In addition to making it possible to progressively-continuously, quickly and fully convert the solution hexavalent chromium content into insoluble trivalent chromium, as the requirements for such reaction exist, the solution is prevented from becoming toxic by, in effect, inhibiting the formation of a soluble metal sulfide. Thus, the discharged water is not polluted or made toxic from the standpoint of soluble metal salts.

While for the purpose of illustration, I have shown a representative form of apparatus for carrying out my invention, it will be apparent to those skilled in the art that various modifications as well as other apparatus arrangements may be employed in accordance with the concept of my invention in order to carry out the novel procedure involved.

What I claim is:

1. A self-regulating method of quickly and effectively conditioning spent cooling water having a toxic hexavalent chromium solution content to make the water innocuous which comprises, providing a mass of hard metal sulfide granules, moving the spent cooling water through the mass in contact with surface portions of the granules and surface-reacting the granules with the hexavalent chromium solution content to fully convert it into trivalent chromium, while inhibiting the forming of a soluble sulfide in the water from the sulfide granules, and while maintaining surfaces of the metal sulfide granules reactive to the hexavalent chromium solution content of the water, and removing the water in an innocuous condition from the mass and discharging it.

2. A method as defined in claim 1 wherein insoluble reaction products are precipitated out from the water before discharging it.

3. A method as defined in claim 1 wherein, the hard metal sulfide granules are of the class consisting of iron, zinc, and calcium sulfides.

4. A method as defined in claim 1 wherein, the surfaces of the metal sulfide granules are maintained reactive by agitating them to scrub their surfaces during the movement of the spent cooling water through the mass.

5. A method as defined in claim 1 wherein, the hard metal sulfide granules are in the form of iron sulfide granules, and the granules are maintained reactive by rubbing their surfaces against each other during the reaction.

6. A method as defined in claim 1 wherein the granules are iron pyrites and the reaction accomplished is represented by the following equation:

$$3FeS_2 + 6H_2O + 3H_2CrO_4 \longrightarrow 3Cr(OH)_3 + 3Fe(OH)_3$$

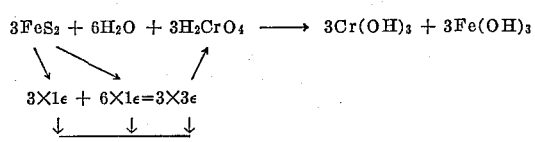

7. A method as defined in claim 1 wherein, the spent cooling water is introduced into the mass in about a neutral to slightly alkaline pH range, and the water is maintained within such range during the precipitating out of the reaction products therefrom.

8. A method as defined in claim 7 wherein the hard metal sulfide granules have a minimum size to pass about a 200 mesh screen and a maximum size of below about one half an inch.

9. A method as defined in claim 1 wherein, the hard metal sulfide granules are scrubbed against each other to maintain their surfaces reactive, the spent cooling water is progressively advanced in a continuous manner through the mass, and the conditioned water is progressively-continuously removed from the mass.

10. A method as defined in claim 9 wherein, the mass is positioned in a container, and an hourly flow rate of the spent cooling water through the mass is maintained of up to about 50% of the volume content of the container.

11. A self-regulating method of quickly and fully conditioning spent cooling water having a hexavalent chromium solution content to provide water without original or imparted toxic solution content which comprises, continuously moving the spent cooling water through a loose mass of metal sulfide pyrite granules while continuously reacting surface portions of the granules therewith and converting the hexavalent chromium solution content into a trivalent chromium, restricting the granules to reaction with only the hexavalent chromium solution content while the spent cooling waters are moved therethrough, forming insoluble reaction products in the water, maintaining the sulfide metal particles reactive to the hexavalent chromium solution content by continuously scrubbing them against each other during the movement of the spent cooling water therethrough, precipitating out the insoluble reaction products from the water while maintaining its pH within about a neutral to a slightly alkaline range, and continuously discharging the conditioned water in a fully nontoxic condition.

12. A method as defined in claim 11 wherein the pH of the spent cooling water is maintained at about 7.5 to 8 during the precipitating out of the insoluble reaction products.

References Cited by the Examiner

UNITED STATES PATENTS

| | | | |
|---|---|---|---|
| 1,932,531 | 10/1933 | Parker | 23—285 |
| 2,110,187 | 3/1938 | Williams | 23—56 |
| 2,977,202 | 3/1961 | Bueltman et al. | 23—285 |
| 3,023,089 | 2/1962 | Graves et al. | 23—285 X |
| 3,027,321 | 3/1962 | Selm et al. | 210—59 |
| 3,218,252 | 11/1965 | Glover et al. | 210—4 |

OTHER REFERENCES

Hoover et al., Disposal of Waste Liquors, from Chromium Plating, Ind. Eng. Chem., vol. 33, No. 1, January 1941, pp. 131–134.

Hutin, L'Oxyde de Chrome et sa recuperation de produits residuaries, Le Cuir Technique, vol. 17, No. 6, Feb. 3, 1928, pp. 139–140.

MORRIS O. WOLK, *Primary Examiner.*

MICHAEL E. ROGERS, *Examiner.*